US00RE47211E

(19) United States
(12) Reissued Patent
Uemura

(10) Patent Number: US RE47,211 E
(45) Date of Reissued Patent: Jan. 22, 2019

(54) INERTIAL SENSOR

(71) Applicant: Panasonic Corporation, Osaka (JP)

(72) Inventor: Takeshi Uemura, Osaka (JP)

(73) Assignee: PANASONIC CORPORATION, Osaka (JP)

(21) Appl. No.: 15/146,999

(22) Filed: May 5, 2016

Related U.S. Patent Documents

Reissue of:
(64) Patent No.: 8,746,034
Issued: Jun. 10, 2014
Appl. No.: 13/394,651
PCT Filed: Sep. 22, 2010
PCT No.: PCT/JP2010/005729
§ 371 (c)(1),
(2) Date: Mar. 7, 2012
PCT Pub. No.: WO2011/039973
PCT Pub. Date: Apr. 7, 2011

(30) Foreign Application Priority Data

Oct. 1, 2009 (JP) ..... 2009-229434

(51) Int. Cl.
*G01P 21/00* (2006.01)
*G01C 19/5776* (2012.01)

(52) U.S. Cl.
CPC ..... *G01C 19/5776* (2013.01)

(58) Field of Classification Search
CPC ..... G01C 19/5607; G01C 19/5776; G01C 19/5649; G01C 19/5726; G01C 25/00; G01C 19/574
USPC ... 73/504.2, 504.12, 504.13, 504.14, 504.15, 73/504.16
See application file for complete search history.

(56) References Cited

U.S. PATENT DOCUMENTS 5,434,467 A * 7/1995 Abe et al. ..... 310/366
5,939,630 A * 8/1999 Nozoe ..... G01C 19/5607 73/1.77
7,292,021 B2 * 11/2007 Tsuruhara ..... G01C 19/5649 324/76.15
2002/0017135 A1 2/2002 Mori et al.
(Continued)

FOREIGN PATENT DOCUMENTS

EP 1367367 A1 12/2003
JP 61-142415 A 6/1986
(Continued)

OTHER PUBLICATIONS

International Search Report for Application No. PCT/JP2010/005729 dated Nov. 2, 2010.

*Primary Examiner* — Kenneth J Whittington
(74) *Attorney, Agent, or Firm* — Pearne & Gordon LLP

(57) ABSTRACT

An inertial sensor includes an oscillator, a drive unit for oscillating the oscillator, a sensor for sensing the amount of inertia applied to the oscillator, and a failure diagnosis unit disposed between the oscillator and the drive unit. The drive unit includes a reference potential supply unit for supplying a reference potential to the oscillator, and a drive signal supply unit for supplying a drive signal to the oscillator based on a monitor signal received from the oscillator. The failure diagnosis unit includes a diagnosis unit for diagnosing a failure based on the value of a current supplied by the reference potential supply unit to the oscillator. The inertial sensor having this structure can detect a failure in the drive unit or the oscillator.

8 Claims, 13 Drawing Sheets

(56) References Cited

U.S. PATENT DOCUMENTS

| | | | | |
|---|---|---|---|---|
| 2005/0052096 | A1 | 3/2005 | Yamashita | |
| 2010/0126271 | A1* | 5/2010 | Inukai | G01C 19/56 73/504.12 |

FOREIGN PATENT DOCUMENTS

| | | | |
|---|---|---|---|
| JP | 04-317861 | A | 11/1992 |
| JP | 2000-193459 | A | 7/2000 |
| JP | 2002-013930 | A | 1/2002 |
| JP | 2002-267448 | A | 9/2002 |
| JP | 2005-083884 | A | 3/2005 |
| JP | 2009-058313 | A | 3/2009 |
| JP | 2009-098081 | A | 5/2009 |

* cited by examiner

INERTIAL SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to an inertial sensor used in various electronic devices for vehicle control or car navigation.

BACKGROUND ART

FIG. 14 is a block diagram of a conventional inertial sensor. As shown in FIG. 14, conventional inertial sensor 130 includes oscillator 131, drive unit 132, and sensing unit 133. Oscillator 131 includes monitoring electrode 131a, driving electrodes 131e and 131c, and sensing electrodes 131b and 131d. Drive unit 132 receives a signal from monitoring electrode 131a, and amplifies and supplies the signal to driving electrodes 131e and 131c. Sensing unit 133 detects the amount of inertia applied from an external source to oscillator 131 based on signals received from sensing electrodes 131b and 131d.

Sensing unit 133 includes oscillating device 135f, switch 135e, current/voltage converters 135c and 135d, differential amplifier 135g, wave detecting device 135h, and failure diagnosis unit 135j. Switch 135e is connected to oscillating device 135f. Current/voltage converter 135c is connected to sensing electrode 131d and switch 135e. Current/voltage converter 135d is connected to sensing electrode 131b. Differential amplifier 135g is connected to current/voltage converters 135c and 135d.

Wave detecting device 135h outputs the amount of inertia applied to oscillator 131 based on a signal from differential amplifier 135g. Failure diagnosis unit 135j diagnoses a failure based on a signal from wave detecting device 135h.

In inertial sensor 130, failures are diagnosed by making oscillating device 135f output an oscillation signal to switch 135e and by making failure diagnosis unit 135j monitor the value of a variable DC.

The conventional inertial sensor, however, cannot diagnose failures that have occurred in the drive unit or the oscillator. Moreover, the inertial sensor cannot detect the amount of inertia during failure diagnosis.

An example of a conventional technique related to the present invention is shown in Patent Literature 1.

CITATION LIST

Patent Literature

Patent Literature 1: Japanese Patent Unexamined Publication No. 2002-267448

SUMMARY OF THE INVENTION

The inertial sensor of the present invention includes an oscillator, a drive unit for oscillating the oscillator, a sensor for sensing the amount of inertia applied to the oscillator from an external source, and a failure diagnosis unit disposed between the oscillator and the drive unit. The drive unit includes a reference potential supply unit for supplying a reference potential to the oscillator, and a drive signal supply unit for supplying a drive signal to the oscillator based on a monitor signal received from the oscillator. The failure diagnosis unit includes a diagnosis unit for diagnosing a failure based on the value of a current supplied by the reference potential supply unit to the oscillator. The inertial sensor having this structure can diagnose a failure in the drive unit or the oscillator, and also detect the amount of inertia even during failure diagnosis.

DESCRIPTION OF EMBODIMENTS

Embodiments of the present invention will be described with reference to drawings. Note, however, that the present invention is not limited to these embodiments.

First Exemplary Embodiment

Figure 1:
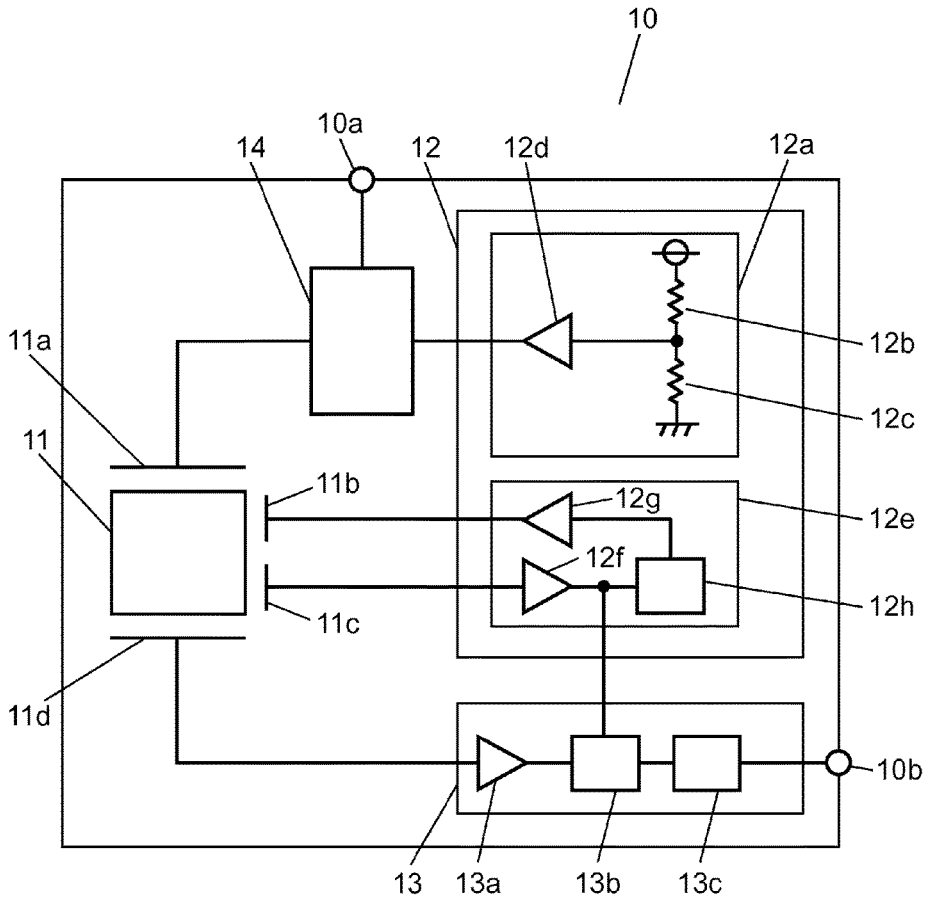
FIG. 1 is a block diagram of an inertial sensor according to a first exemplary embodiment of the present invention.

FIG. 1 is a block diagram of inertial sensor 10 according to a first exemplary embodiment. In FIG. 1, inertial sensor 10 includes oscillator 11, drive unit 12, sensing unit 13, and failure diagnosis unit 14, which is disposed between oscillator 11 and drive unit 12. Drive unit 12 oscillates oscillator 11. Sensing unit 13 senses the amount of inertia applied to oscillator 11 from an external source.

The following is a detailed description of each block of inertial sensor 10. Drive unit 12 includes reference potential supply unit 12a, and drive signal supply unit 12e. Reference potential supply unit 12a supplies a reference potential to oscillator 11. Drive signal supply unit 12e supplies a drive signal to oscillator 11 based on a monitor signal received from oscillator 11.

Reference potential supply unit 12a includes resistors 12b and 12c, and reference potential supply amplifier 12d. Resistors 12b and 12c divide the power supply voltage, thereby generating a reference potential. Reference potential supply amplifier 12d supplies the reference potential to oscillator 11.

Drive signal supply unit 12e includes I-V conversion amplifier 12f, filter 12h, output amplifier 12g, and an AGC (Auto Gain Control) amplifier (not shown). I-V conversion amplifier 12f converts the current value of the monitor signal into a voltage value. The AGC amplifier makes the amplitude value of the monitor signal nearly constant. Filter 12h rejects unwanted signals. Output amplifier 12g supplies the drive signal to oscillator 11. Drive signal supply unit 12e may receive the monitor signal as a positive or negative differential signal, and also may output the drive signal as a positive or negative differential signal.

Oscillator 11 includes electrodes 11a, 11b, 11c, and 11d. Oscillator 11 performs driving oscillation at a driving oscillation frequency based on the reference potential received by electrode 11a and the drive signal received by electrode 11b. The driving oscillation frequency depends on the shape and other conditions of oscillator 11. The driving oscillation generates a monitor signal, which is outputted from electrode 11c. Oscillator 11 also performs detection oscillation according to the amount of inertia applied by an external source. The detection oscillation generates a detection signal, which is outputted from electrode 11d. Oscillator 11 may perform driving oscillation based on the drive signal by using any one of the following: a piezoelectric method, a capacitance method, and an electromagnetic drive method. Similarly, the driving oscillation may be generated from a monitor signal, or the detection signal may be generated from detection oscillation by using any one of the following: a piezoelectric method, a capacitance method, and an electromagnetic drive method.

Sensing unit 13 includes I-V conversion amplifier 13a, wave detector 13b, and low-pass filter 13c. I-V conversion amplifier 13a converts the current value of a detection signal into a voltage value. Wave detector 13b detects a signal coming from I-V conversion amplifier 13a using the monitor signal. Low-pass filter 13c smoothes a signal received from wave detector 13b. Sensing unit 13 outputs a voltage value to output unit 10b. This voltage value corresponds to the amount of inertia applied to oscillator 11 from an external source.

Failure diagnosis unit 14 measures the amount of current supplied from reference potential supply unit 12a to oscillator 11, and diagnoses a failure in drive unit 12 or oscillator 11 based on the amount of current. The diagnosis result is outputted from output unit 10a.

Figure 2A:
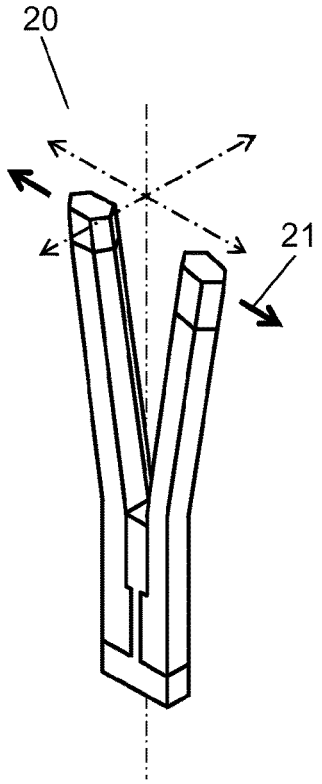
FIG. 2A is a schematic diagram showing driving oscillation in a tuning fork oscillator of the inertial sensor according to the first exemplary embodiment.
Figure 2B:
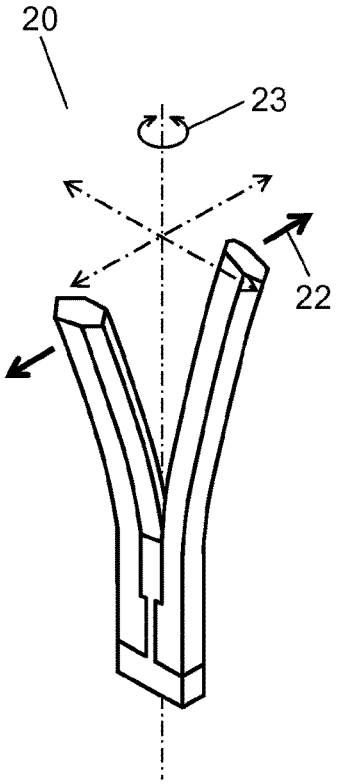
FIG. 2B is a schematic diagram showing detection oscillation in the tuning fork oscillator of the inertial sensor according to the first exemplary embodiment.

FIG. 2A is a schematic diagram showing driving oscillation in a tuning fork oscillator of the inertial sensor according to the first exemplary embodiment. FIG. 2B is a schematic diagram showing detection oscillation in the tuning fork oscillator. FIGS. 2A and 2B shows tuning fork oscillator 20, which is an example of oscillator 11 shown in FIG. 1. When tuning fork oscillator 20 is used as oscillator 11, an angular velocity applied by an external source to tuning fork oscillator 20 can be detected. The following is a description of a method for detecting an angular velocity using tuning fork oscillator 20.

Tuning fork oscillator 20 generates driving oscillation 21 and detection oscillation 22 as shown in FIGS. 2A and 2B, respectively.

When receiving a drive signal from drive unit 12, tuning fork oscillator 20 generates driving oscillation 21 having a unique driving oscillation frequency. When receiving angular velocity 23 shown in FIG. 2B in this situation, tuning fork oscillator 20 generates detection oscillation 22 in the direction perpendicular to the rotation axis of driving oscillation 21 and angular velocity 23 by the Coriolis force. Tuning fork oscillator 20 outputs a detection signal based on detection oscillation 22. This detection signal has the same frequency as driving oscillation 21, and an amplitude dependent on angular velocity 23. Consequently, sensing unit 13 can detect angular velocity 23 by detecting the detection signal using the monitor signal.

Figure 3A:
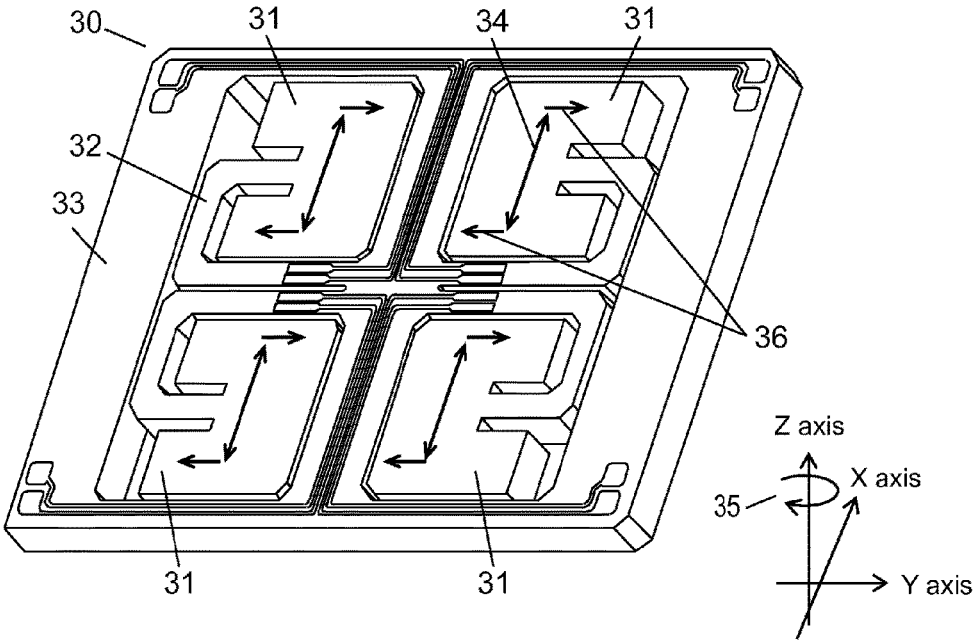
FIG. 3A is a schematic diagram of a multi-axis detection oscillator of the inertial sensor according to the first exemplary embodiment.
Figure 3B:
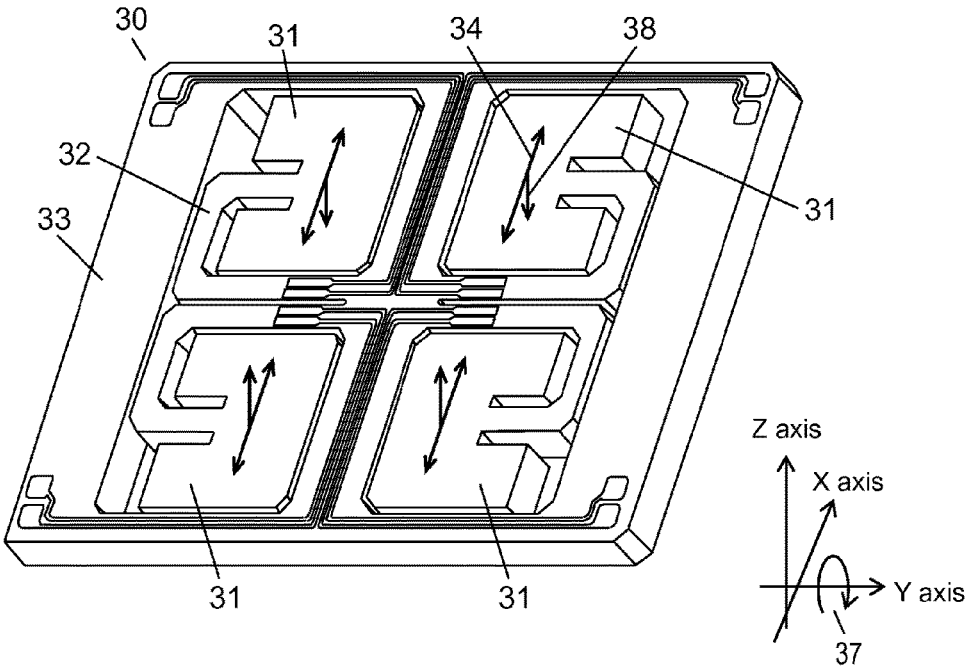
FIG. 3B is another schematic diagram of the multi-axis detection oscillator of the inertial sensor according to the first exemplary embodiment.

FIGS. 3A and 3B are schematic diagrams of a multi-axis detection oscillator of the inertial sensor according to the first exemplary embodiment. FIGS. 3A and 3B show multi-axis detection oscillator 30, which is another example of oscillator 11. When applied with driving oscillation in the X axis, multi-axis detection oscillator 30 can detect angular velocities around the Y and Z axes. The following is a description of a method for detecting the angular velocities around the Y and Z axes when multi-axis detection oscillator 30 is used as oscillator 11 shown in FIG. 1.

In FIG. 3A, an angular velocity around the Z axis is detected. Multi-axis detection oscillator 30 includes four weights 31, four arms 32, and support body 33. Weights 31 are connected to support body 33 via respective arms 32. The following is a description of the operation of multi-axis detection oscillator 30 used as oscillator 11 shown in FIG. 1. When receiving a drive signal from drive unit 12, multi-axis detection oscillator 30 generates driving oscillation 34 having a unique driving oscillation frequency in the X-axis direction. When receiving angular velocity 35 around the Z axis in this situation, multi-axis detection oscillator 30 generates detection oscillation 36 in the Y-axis direction. The Y-axis direction is perpendicular to driving oscillation 34 in the X-axis direction and angular velocity 35 in the Z axis direction by the Coriolis force. Multi-axis detection oscillator 30 outputs a detection signal based on detection oscillation 36. This detection signal has the same frequency as driving oscillation 34, and an amplitude dependent on angular velocity 35. Consequently, sensing unit 13 can detect angular velocity 35 by detecting the detection signal using the monitor signal.

In FIG. 3B, an angular velocity around the Y axis is detected. In this case, when receiving angular velocity 37 around the Y axis, multi-axis detection oscillator 30 generates detection oscillation 38 in the Z-axis direction. The Z-axis direction is perpendicular to driving oscillation 34 in the X-axis direction and angular velocity 37 in the Y-axis direction by the Coriolis force. Multi-axis detection oscillator 30 outputs a detection signal based on detection oscillation 38. This detection signal has the same frequency as driving oscillation 34, and an amplitude dependent on angular velocity 37. Consequently, sensing unit 13 can detect angular velocity 37 by detecting the detection signal using the monitor signal.

Figure 4:
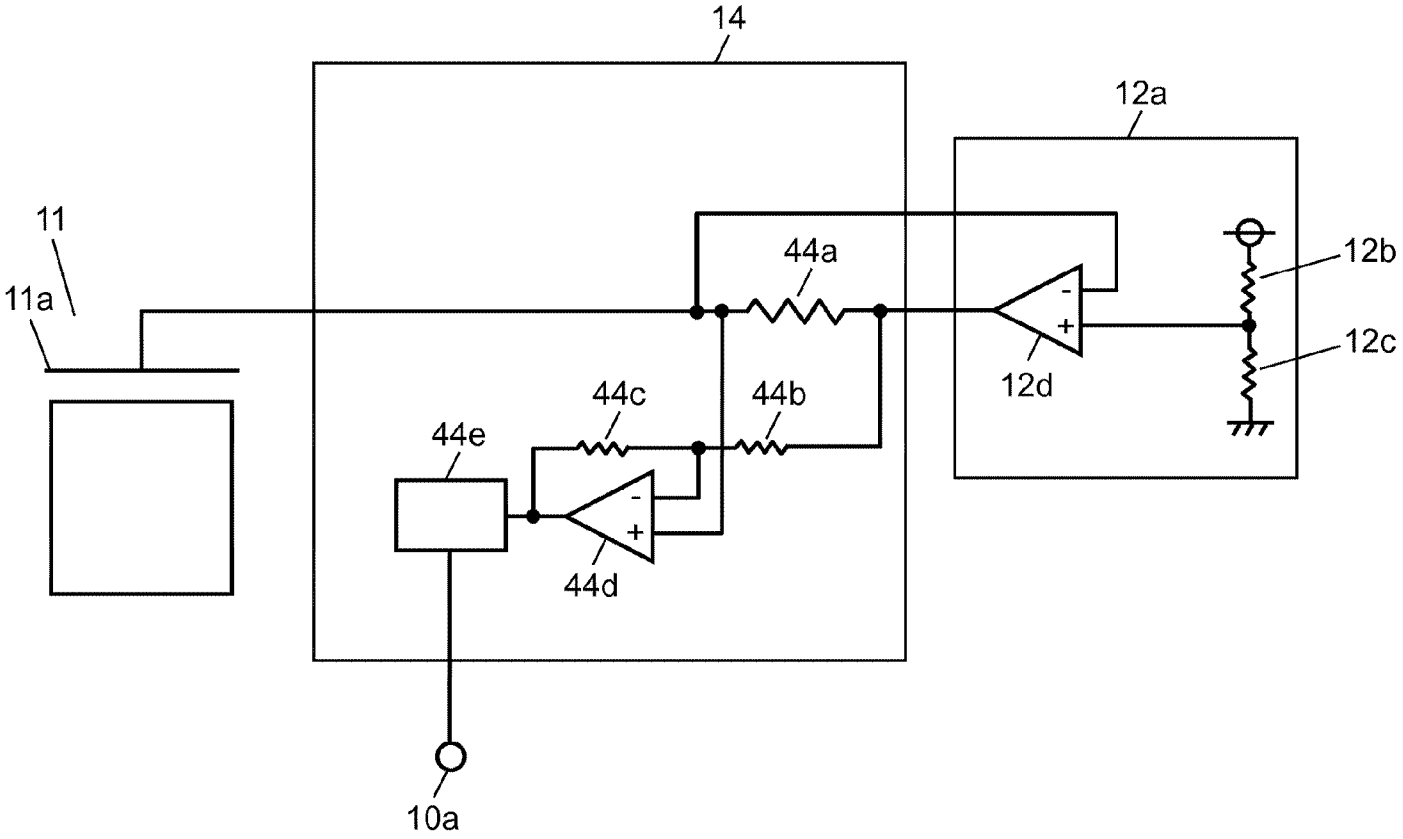
FIG. 4 is a block diagram of a failure diagnosis unit, a reference potential supply unit, and an oscillator of the inertial sensor according to the first exemplary embodiment.

FIG. 4 is a block diagram of failure diagnosis unit 14, reference potential supply unit 12a, and oscillator 11 of the inertial sensor according to the first exemplary embodiment. Failure diagnosis unit 14 includes resistors 44a, 44b, and 44c, operational amplifier 44d (amplifier 44d), and diagnosis unit 44e. Failure diagnosis unit 14 measures a voltage drop across resistor 44a, which is disposed between reference potential supply unit 12a and oscillator 11. As a result, failure diagnosis unit 14 measures the amount of current supplied from reference potential supply unit 12a to oscillator 11. In order to measure the voltage drop across resistor 44a, resistor 44a is connected at its input to an inverting terminal via resistor 44b. Resistor 44a is connected as its output to operational amplifier 44d via a non-inverting terminal. Resistor 44c is connected between the output terminal of operational amplifier 44d and the inverting terminal. Diagnosis unit 44e diagnoses a failure based on a voltage received from operational amplifier 44d.

Diagnosis unit 44e is configured to output a failure signal when an AC voltage outputted from operational amplifier 44d is outside a predetermined voltage range. Diagnosis unit 44e detects a failure mode where a constant offset is added to the amount of current flowing through resistor 44a.

The following is a description of how failure diagnosis unit 14 diagnoses a failure in drive unit 12 or oscillator 11.

Figure 5:
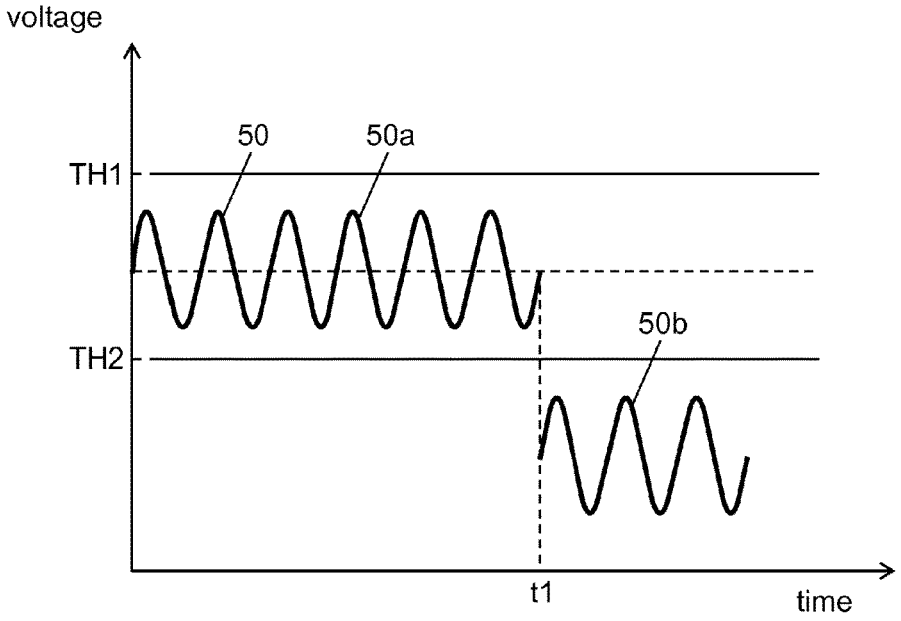
FIG. 5 is a voltage waveform of the failure diagnosis unit of the inertial sensor according to the first exemplary embodiment.

FIG. 5 is a voltage waveform of the failure diagnosis unit of the inertial sensor according to the first exemplary embodiment. The voltage waveform in FIG. 5 is generated by the diagnosis unit. In FIG. 5, the horizontal and vertical axes represent voltage and time, respectively. A signal received by diagnosis unit 44e generates voltage waveform 50. The current flowing through resistor 44a is AC because drive unit 12 wave-shapes an AC monitor signal generated by driving oscillation of oscillator 11, and provides an AC drive signal to oscillator 11. Therefore, voltage waveform 50 of the signal received by diagnosis unit 44e is an AC waveform as shown in FIG. 5.

Voltage waveform 50 includes voltage waveform 50a before a time t1 and voltage waveform 50b after the time t1. Voltage waveform 50a indicates that drive unit 12 or oscillator 11 is operating normally. Voltage waveform 50b indicates that drive unit 12 or oscillator 11 has broken down.

If, for example, internal circuits of drive unit 12 are short circuited, a leak current is generated, and hence a constant offset is added to the amount of current flowing through resistor 44a. This failure mode can be detected by comparing voltage waveform 50 with an upper threshold TH1 and a lower threshold TH2 of a normal voltage.

Figure 6:
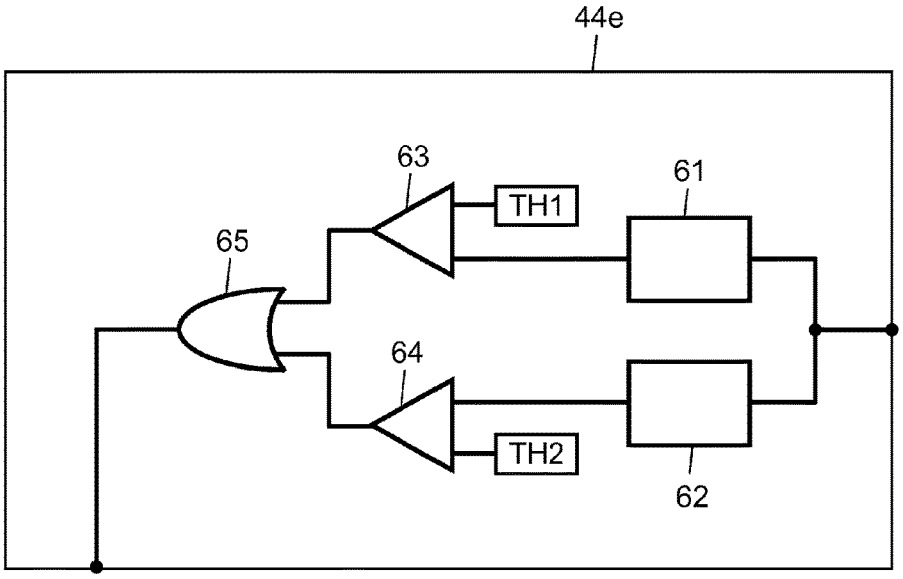
FIG. 6 is a block diagram of a diagnosis unit of the inertial sensor according to the first exemplary embodiment.

FIG. 6 is a block diagram of the diagnosis unit of the inertial sensor according to the first exemplary embodiment. FIG. 6 is a block diagram of diagnosis unit 44e. Diagnosis unit 44e includes maximum value calculator 61, minimum value calculator 62, comparators 63, 64, and failure signal output unit 65. Maximum value calculator 61 holds the upper limit of the amplitude of an input signal. Minimum value calculator 62 holds the lower limit of the amplitude of the input signal. Comparator 63 outputs a high signal when the output value of maximum value calculator 61 is larger than the upper threshold TH1. Comparator 64 outputs a high signal when the output value of minimum value calculator 62 is smaller than the lower threshold TH2. Failure signal output unit 65 outputs a high signal as a signal indicating a failure when one of comparators 63 and 64 outputs a high signal. Thus, diagnosis unit 44e can detect the failure mode where the constant offset is added to the amount of current flowing through resistor 44a.

As described above, according to inertial sensor 10, failure diagnosis unit 14 diagnoses a failure in drive unit 12 or oscillator 11. In addition, reference potential supply unit 12a supplies a reference potential to oscillator 11 even during failure diagnosis. Therefore, the amount of inertia applied to oscillator 11 from an external source can be detected even during failure diagnosis.

According to the present exemplary embodiment, as shown in FIG. 4, the amount of current supplied from reference potential supply unit 12a to oscillator 11 is measured by voltage drop across resistor 44a. It is possible, however, to employ other methods to measure the amount of current supplied from reference potential supply unit 12a to oscillator 11.

Figure 7:
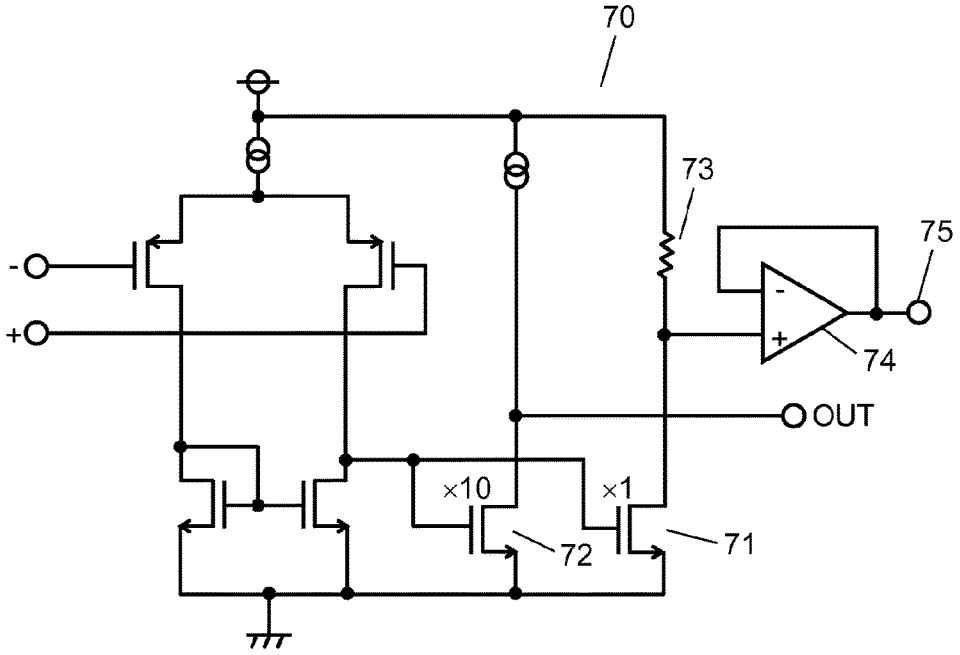
FIG. 7 is a block diagram of the failure diagnosis unit having a current mirror circuit of the inertial sensor according to the first exemplary embodiment.

FIG. 7 is a block diagram of the failure diagnosis unit, which has a current mirror circuit, of the inertial sensor according to the first exemplary embodiment. Operational amplifier 70 shown in FIG. 7 is an example of operational amplifier 44d, and has the current mirror circuit. Operational amplifier 70 includes current mirror transistor 71 and output driver transistor 72 connected in parallel with each other. Assume that the mirror ratio is set to 10:1. The mirror ratio is the ratio between the amplification factor of output driver transistor 72 and the amplification factor of current mirror transistor 71. In this case, the current flowing through current mirror transistor 71 can be one-tenth of the current flowing through output driver transistor 72. Measuring the amount of current supplied to current mirror transistor 71 can prevent an excessive increase in consumption current due to current measurement. Operational amplifier 70 further includes monitor resistor 73, buffer amplifier 74, and output terminal 75. A monitoring current flowing through current mirror transistor 71 flows through monitor resistor 73 where the monitoring current is converted into a voltage. This voltage flows through buffer amplifier 74 and output terminal 75 from which the voltage is outputted as a current monitor output. This structure prevents a decrease in the dynamic range of the amplifier output due to a voltage drop caused when resistor 44a shown in FIG. 4 is used. In FIG. 7, operational amplifier 70 includes a sink-current output stage having a constant current source and an n-channel output driver transistor. Operational amplifier 70 may alternatively include a source-current output stage having a constant current source and a p-channel output driver transistor. Operational amplifier 70 may alternatively include a push-pull output stage having a p-channel driver transistor and an n-channel driver transistor. In a push-pull amplifier, a source current and a sink current can be monitored by using a current mirror circuit of an n-channel driver transistor, and a current mirror circuit of a p-channel driver transistor.

Measuring the amount of current supplied from output amplifier 12g to oscillator 11 can also diagnose a failure in drive unit 12 or oscillator 11, and detect the amount of inertia even during failure diagnosis.

Second Exemplary Embodiment

Figure 8:
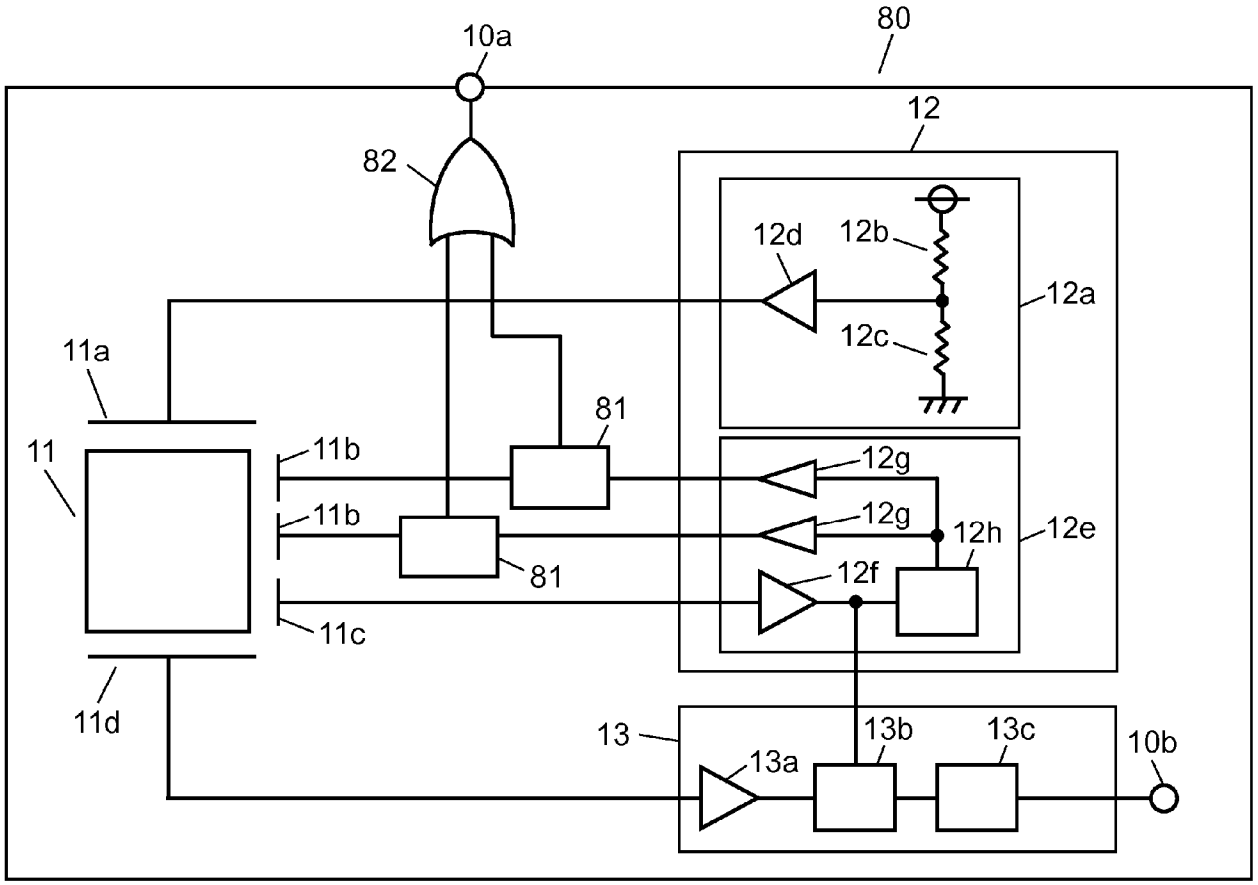
FIG. 8 is a block diagram of an inertial sensor according to a second exemplary embodiment of the present invention.

FIG. 8 is a block diagram of an inertial sensor according to a second exemplary embodiment of the present invention. The following is a description of differences between the first and second exemplary embodiments so as to define the features of the second exemplary embodiment. Inertial sensor 80 shown in FIG. 8 measures the amount of current supplied from output amplifier 12g to oscillator 11. Inertial sensor 80 includes two failure diagnosis units 81, two output amplifiers 12g, and two electrodes 11b. Each failure diagnosis unit 81 is disposed between one of output amplifiers 12g and one of electrodes 11b. Inertial sensor 80 further includes failure signal output unit 82, which outputs a failure signal to output unit 10a when one of failure diagnosis units 81 outputs a failure signal.

In inertial sensor 80 having this structure, it is possible to detect not only the failure mode where the constant offset is added to the amount of current shown in FIG. 5, but also a failure mode where the amplitude of the current has increased.

Each failure diagnosis unit 81 can have a similar structure to failure diagnosis unit 14. Each failure diagnosis unit 81 has a diagnosis unit, which can have a similar structure to diagnosis unit 44e.

Figure 9:
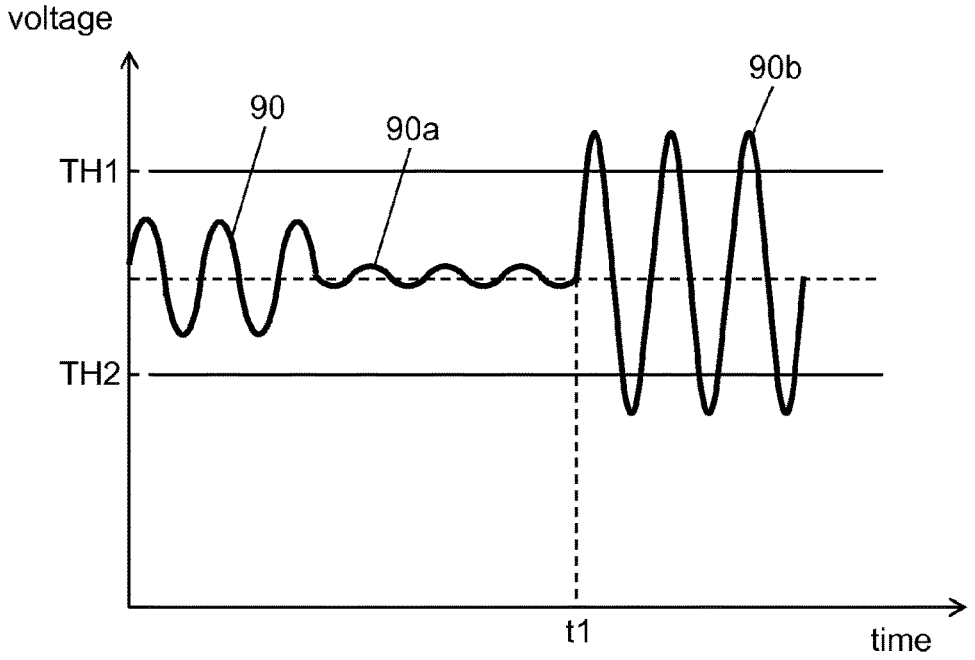
FIG. 9 is a voltage waveform of a failure diagnosis unit of the inertial sensor according to the second exemplary embodiment.

FIG. 9 is a voltage waveform of the failure diagnosis unit of the inertial sensor according to the second exemplary embodiment. The voltage waveform of FIG. 9 shows the failure mode where the amplitude of the voltage has increased. Voltage waveform 90 includes voltage waveforms 90a and 90b. Voltage waveform 90a is generated immediately after the occurrence of disconnection. Voltage waveform 90b, which is generated after the time t1, shows an increase in the amplitude of the voltage.

Such a failure mode occurs, for example, when one of two output amplifiers 12g breaks down or when the wire between one output amplifier 12g and one electrode 11b breaks. In this case, the drive signal is supplied only by the remaining output amplifier 12g. This temporarily reduces the amount of current of the drive signal supplied to oscillator 11, and the amount of current of the monitor signal. In this case, however, an AGC amplifier (not shown) of drive signal supply unit 12e keeps constant the amount of current of the monitor signal. This increases the amount of current outputted from the remaining output amplifier 12g. As a result, voltage waveform 90a is changed to voltage waveform 90b. The failure mode can be detected by comparing upper threshold TH1 and lower threshold TH2.

Third Exemplary Embodiment

Figure 10:
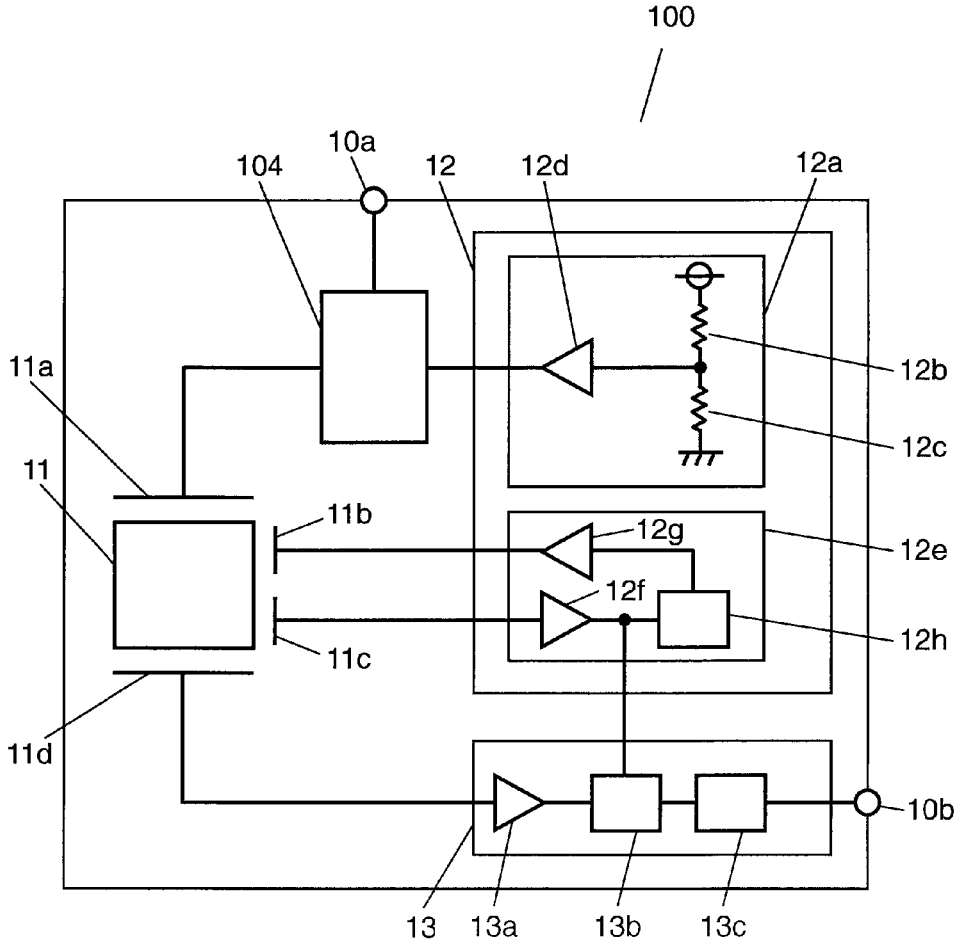
FIG. 10 is a block diagram of an inertial sensor according to a third exemplary embodiment of the present invention.

FIG. 10 is a block diagram of an inertial sensor according to a third exemplary embodiment.

Figure 11:
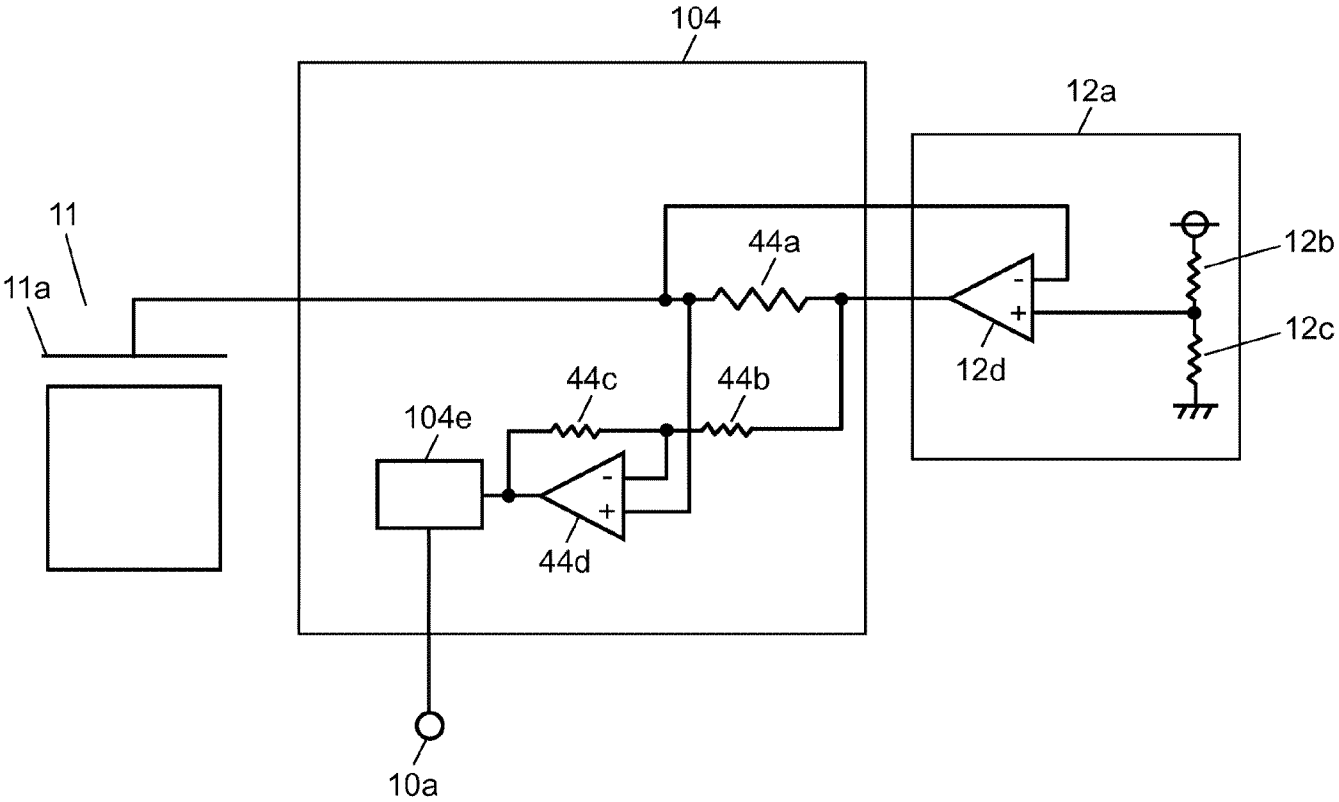
FIG. 11 is a block diagram of a failure diagnosis unit, a reference potential supply unit, and an oscillator of the inertial sensor according to the third exemplary embodiment.
Figure 12:
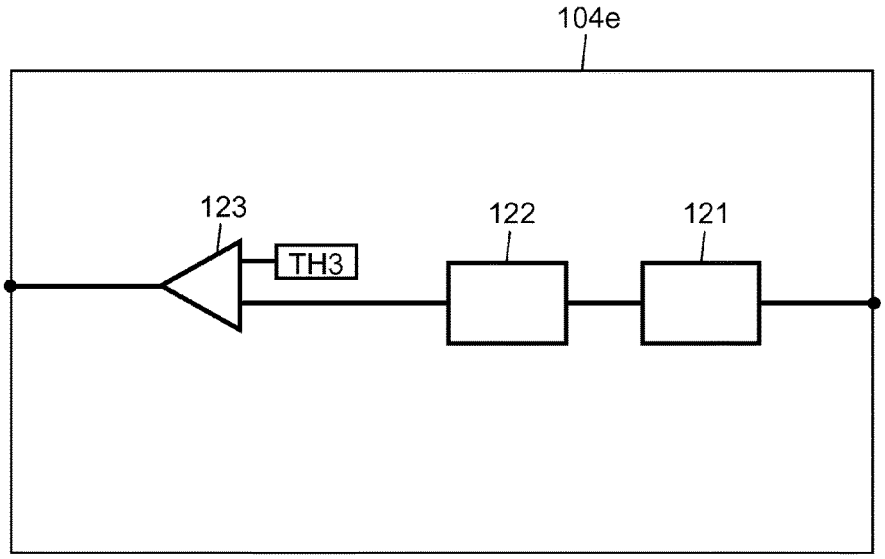
FIG. 12 is a block diagram of a diagnosis unit of the inertial sensor according to the third exemplary embodiment.

FIG. 11 is a block diagram of a failure diagnosis unit, a reference potential supply unit, and an oscillator of the inertial sensor. FIG. 12 is a block diagram of a diagnosis unit of the inertial sensor. The following is a description of differences between the first and third exemplary embodiments so as to define the features of the third exemplary embodiment.

FIG. 11 shows failure diagnosis unit 104, reference potential supply unit 12a, and oscillator 11. As shown in FIG. 11, failure diagnosis unit 104 includes diagnosis unit 104e instead of diagnosis unit 44e shown in FIG. 4.

Diagnosis unit 104e is configured to output a failure signal when the amplitude value of the AC voltage outputted from operational amplifier 44d is equal to or less than a predetermined value. Diagnosis unit 104e detects a failure mode where the amount of current supplied to resistor 44a is nearly zero.

FIG. 12 is a block diagram of diagnosis unit 104e. Diagnosis unit 104e includes full-wave rectifier 121, low-pass filter 122, and comparator 123. Full-wave rectifier 121 full-wave rectifies a received AC voltage. Low-pass filter 122 smoothes the output signal of full-wave rectifier 121. Comparator 123 outputs a high signal when the output value of low-pass filter 122 is smaller than a threshold TH3. Thus, diagnosis unit 104e detects the failure mode where the amount of current supplied to resistor 44a is nearly zero.

The following is a description of how failure diagnosis unit 104 diagnoses a failure in drive unit 12 or oscillator 11.

Figure 13A:
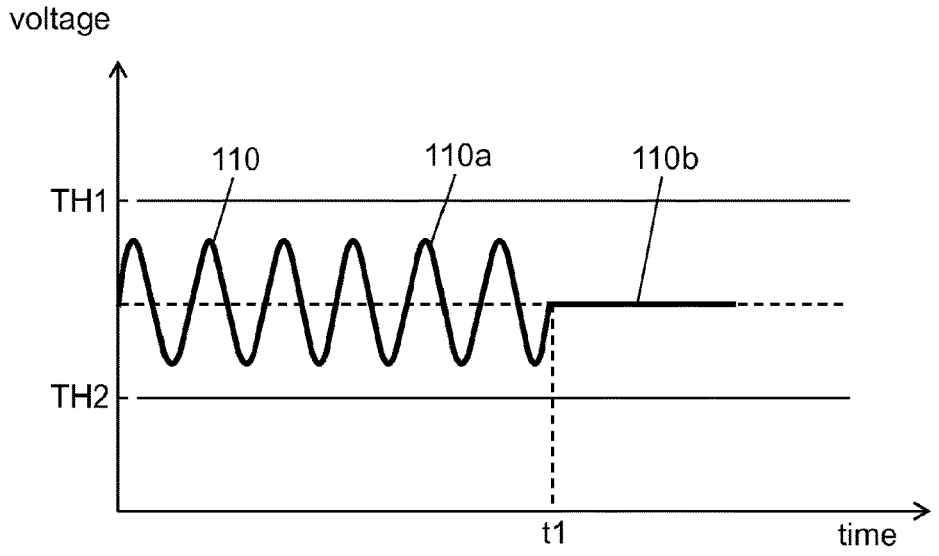
FIG. 13A is a voltage waveform of the failure diagnosis unit of the inertial sensor according to the third exemplary embodiment.

FIG. 13A is a voltage waveform of the failure diagnosis unit of the inertial sensor according to the third exemplary embodiment. The voltage waveform in FIG. 13A is generated by diagnosis unit 104e. In FIG. 13A, the horizontal and vertical axes represent voltage and time, respectively. A signal received by diagnosis unit 104e generates voltage waveform 110.

Voltage waveform 110 includes voltage waveform 110a before a time t1 and voltage waveform 110b after the time t1. Voltage waveform 110a indicates that drive unit 12 or oscillator 11 is operating normally. Voltage waveform 110b indicates that drive unit 12 or oscillator 11 has broken down.

Assume, for example, that oscillator 11 stops oscillation due to an abnormality of drive unit 12, or that the wire between drive unit 12 and oscillator 11 is broken. In this case, the amount of current supplied to resistor 44a is nearly zero. Diagnosis unit 44e cannot detect this failure mode because the voltage of voltage waveform 110b is between upper threshold TH1 and lower threshold TH2 as shown in FIG. 13A. It is possible, however, to diagnose a failure by determining whether or not the amplitude value of voltage waveform 110 is equal to or less than the predetermined value.

Figure 13B:
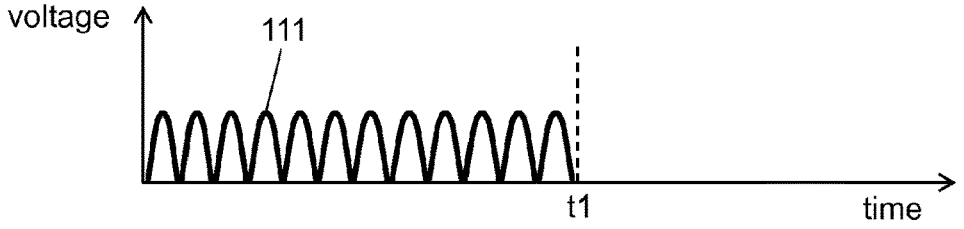
FIG. 13B shows an output signal of a full-wave rectifier of the inertial sensor according to the third exemplary embodiment.

FIG. 13B shows an output signal of the full-wave rectifier of the inertial sensor according to the third exemplary embodiment. FIG. 13B shows output signal 111 of full-wave rectifier 121 in diagnosis unit 104e. Output signal 111 has a normal waveform until a time t1, and has a waveform indicating the presence of a failure from time t1 onward.

Figure 13C:
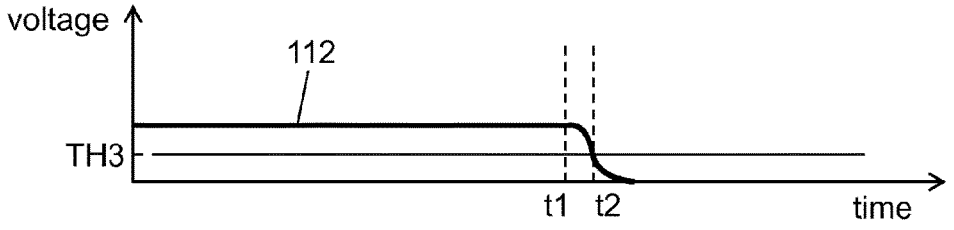
FIG. 13C shows an output signal of a low-pass filter of the inertial sensor according to the third exemplary embodiment.
Figure 14:
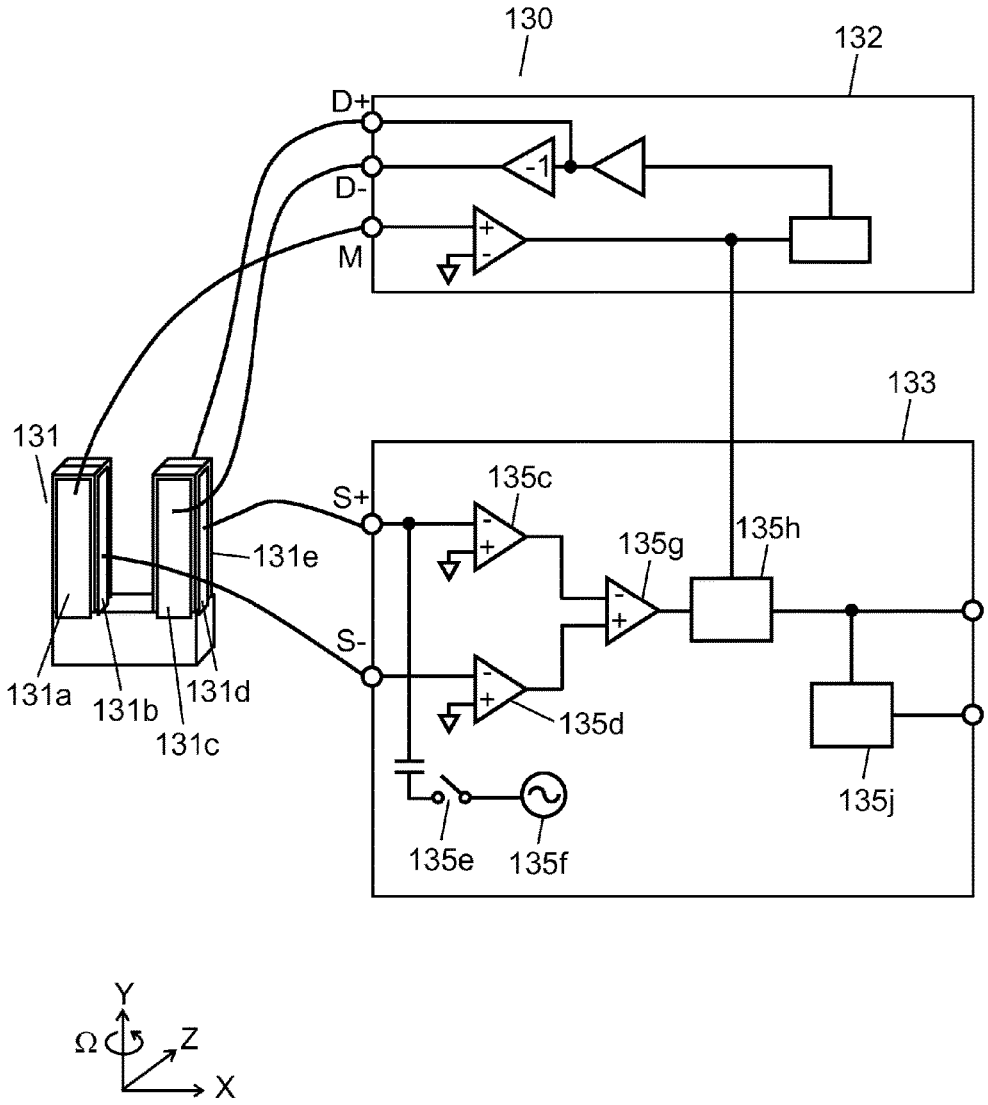
FIG. 14 PRIOR ART
FIG. 14 is a block diagram of a conventional inertial sensor.

FIG. 13C shows an output signal of the low-pass filter of the inertial sensor according to the third exemplary embodiment. FIG. 13C shows output signal 112 of low-pass filter 122. Output signal 112 has a normal waveform until a time t1, and has a waveform indicating the presence of a failure from time t1 onward. At a time t2 when a predetermined time has passed since the time t1, output signal 112 has a voltage value smaller than the threshold TH3 due to the delay time caused by low-pass filter 122. As a result, diagnosis unit 104e outputs the failure signal at the time t2.

Failure diagnosis unit 104 may alternatively be disposed between output amplifier 12g and oscillator 11. In this case, failure diagnosis unit 104 can detect a failure mode where the amplitude of the current outputted from output amplifier 12g to oscillator 11 is equal to or less than a predetermined value. In the case where two output amplifiers 12g output differential outputs, two failure diagnosis units 104 may be disposed at the outputs of two output amplifiers 12g as in failure diagnosis units 81 shown in FIG. 8. In this case, failure diagnosis unit 104 can detect the failure mode where the amplitude of the current outputted from one of output amplifiers 12g is equal to or less than the predetermined value.

INDUSTRIAL APPLICABILITY

The inertial sensor of the present invention can diagnose a failure in the drive unit or the oscillator, and can also detect the amount of inertia even during failure diagnosis. For this reason, the inertial sensor is useful as a sensor used in various electronic devices, especially for vehicle control or car navigation.

REFERENCE MARKS IN THE DRAWINGS

10, 80, 100 inertial sensor
10a, 10b output unit
11 oscillator
11a, 11b, 11c, 11d electrode
12 drive unit
12a reference potential supply unit
12b, 12c resistor
12d reference potential supply amplifier
12e drive signal supply unit
12f I-V conversion amplifier
12g output amplifier
12h filter
13 sensor
13a I-V conversion amplifier
13b wave detector
13c low-pass filter
14, 81, 104 failure diagnosis unit
20 tuning fork oscillator
21, 34 driving oscillation
22, 36, 38 detection oscillation
23, 35, 37 angular velocity
30 multi-axis detection oscillator
31 weight
32 arm
33 support body
44a, 44b, 44c resistor
44d, 70 operational amplifier (amplifier)
44e, 104e diagnosis unit
50, 50a, 50b voltage waveform
90, 90a, 90b voltage waveform
110, 110a, 110b voltage waveform
61 maximum value calculator
62 minimum value calculator
63, 64, 123 comparator
65, 82 failure signal output unit
71 current mirror transistor
72 output driver transistor
73 monitor resistor
74 buffer amplifier
75 output terminal
111 output signal
112 output signal
121 full-wave rectifier
122 low-pass filter

The invention claimed is:

1. An inertial sensor comprising:
an oscillator;
a drive unit for oscillating the oscillator;
a sensor for sensing an amount of angular velocity applied to the oscillator; and
a failure diagnosis unit disposed between the oscillator and the drive unit, wherein
the drive unit includes:
a reference potential supply [unit] *amplifier* for supplying a reference potential to *an electrode of* the oscillator; and
a drive signal supply unit for supplying a drive signal to the oscillator based on a monitor signal received from the oscillator, and
*wherein* the failure diagnosis unit *measures the reference potential and* includes:
a diagnosis unit for diagnosing a failure [based on a value of a current supplied by the reference potential supply unit to the oscillator] *in the drive unit or the oscillator based on the reference potential, and being disposed between the reference potential supply amplifier and the electrode of the oscillator.*

2. The inertial sensor of claim 1, wherein
*the diagnosis unit diagnosis the failure in the drive unit based on a value of a current supplied by the reference potential supply amplifier to the electrode of the oscillator,*
the diagnosis unit includes:
a maximum value calculator for outputting a maximum value of the current;
a minimum value calculator for outputting a minimum value of the current;
a first comparator for outputting a failure signal when the maximum value is larger than a predetermined upper threshold;
a second comparator for outputting a failure signal when the minimum value is smaller than a predetermined lower threshold; and
a failure signal output unit for outputting a failure signal when one of the first comparator and the second comparator outputs a failure signal.

3. The inertial sensor of claim 2, [wherein] *further comprising:*
*a second failure diagnosis unit disposed between the oscillator and the drive unit, for diagnosing a failure in the drive unit or the oscillator; and*
[the failure signal output unit outputs different failure signals depending on whether] *a second failure signal output unit that outputs a failure signal when* the failure signal output unit receives a failure signal from the [first comparator or from the second comparator] *diagnosis unit or the second diagnosis unit.*

4. The inertial sensor of claim 1, wherein
the diagnosis unit includes:
a full-wave rectifier for full-wave rectifying [the] *a* voltage value *of the reference potential*;
a low-pass filter for smoothing an output signal from the full-wave rectifier; and
a comparator for outputting a failure signal when an output signal from the low-pass filter is smaller than a predetermined threshold.

5. The inertial sensor of claim 1, wherein
the failure diagnosis unit includes:
a resistor connected in series between the reference potential supply [unit] *amplifier* and *the electrode of* the oscillator; and
an amplifier for amplifying a voltage difference between both ends of the [register] *resistor*, wherein
the diagnosis unit diagnoses a failure based on a voltage value received from the amplifier.

6. The inertial sensor of claim 5, wherein
the diagnosis unit includes:
a maximum value calculator for outputting a maximum value of the current;
a minimum value calculator for outputting a minimum value of the current;

a first comparator for outputting a failure signal when the maximum value is larger than a predetermined upper threshold;

a second comparator for outputting a failure signal when the minimum value is smaller than a predetermined lower threshold; and a failure signal output unit for outputting a failure signal when one of the first comparator and the second comparator outputs a failure signal.

7. The inertial sensor of claim 5, wherein the diagnosis unit includes:

a full-wave rectifier for full-wave rectifying [the] *a* voltage value *of the reference potential*;

a low-pass filter for smoothing an output signal from the full-wave rectifier; and a comparator for outputting a failure signal when an output signal from the low-pass filter is smaller than a predetermined threshold.

*8. An inertial sensor comprising:*

*an oscillator;*

*a drive unit for oscillating the oscillator;*

*a sensor for sensing an amount of angular velocity applied to the oscillator; and*

*a failure diagnosis unit for diagnosing a failure in the drive unit or the oscillator,*

*wherein the drive unit includes:*

*a reference potential supply amplifier for supplying a reference potential to an electrode of the oscillator; and*

*a drive signal supply unit for supplying a drive signal to the oscillator based on a monitor signal received from the oscillator, and*

*wherein the failure diagnosis unit receives the reference potential, and diagnoses the failure by measuring the reference potential.*

* * * * *